United States Patent
Flammersfeld et al.

(10) Patent No.: US 6,347,272 B2
(45) Date of Patent: Feb. 12, 2002

(54) VEHICLE PASSING SPEED TIMER

(75) Inventors: Stephen Karl Flammersfeld, Ann Arbor; Richard M. Avery, Jr., West Bloomfield; Ian D. McKenzie, Canton, all of MI (US)

(73) Assignee: Detroit Diesel Corporation, Detroit, MI (US)

( * ) Notice: Subject to any disclaimer, the term of this patent is extended or adjusted under 35 U.S.C. 154(b) by 0 days.

(21) Appl. No.: 09/849,543

(22) Filed: May 4, 2001

Related U.S. Application Data

(63) Continuation of application No. 09/430,739, filed on Oct. 29, 1999, now abandoned.

(51) Int. Cl.$^7$ .................................................. B60T 7/12
(52) U.S. Cl. ........................................ 701/93; 180/178
(58) Field of Search ................................. 180/170, 171, 180/172, 173, 174, 175, 176, 177, 178, 179; 701/93, 96, 97, 98, 110; 123/350

(56) References Cited

U.S. PATENT DOCUMENTS

| | | | |
|---|---|---|---|
| 5,477,827 A | * 12/1995 | Welsman, II et al. | ....... 123/436 |
| 5,941,915 A | 8/1999 | Federle et al. | |
| 6,078,873 A | 6/2000 | Shutty et al. | |
| 6,282,482 B1 | * 8/2001 | Hedström | ..................... 701/93 |
| 6,282,484 B1 | * 8/2001 | Enomoto et al. | ............. 701/93 |
| 6,283,240 B1 | * 9/2001 | Beever | ....................... 180/178 |

* cited by examiner

Primary Examiner—Richard M. Camby
(74) Attorney, Agent, or Firm—Brooks & Kushman P.C.

(57) ABSTRACT

A system and method for controlling an engine in a vehicle which allows the vehicle operator to manually request a vehicle speed in excess of the established vehicle speed limit that includes establishing a normal vehicle speed limit, establishing a passing duration period, establishing a passing override reset interval, and controlling the engine in response to operator input to provide a greater vehicle speed for a cumulative period not greater than the passing duration period at any time during the passing override reset interval. The system and method may include the capability of establishing a passing speed increment and controlling the vehicle speed during passing to limit the vehicle to a speed not exceeding the normal vehicle speed limit plus the passing speed increment.

17 Claims, 3 Drawing Sheets

VEHICLE PASSING SPEED TIMER

CROSS-REFERENCE TO RELATED APPLICATIONS

This application is a continuation of U.S. application Ser. No. 09/430,739, filed Oct. 29, 1999 now abandoned.

TECHNICAL FIELD

This application relates to a system and method for controlling an engine to allow a vehicle operator to manually exceed an established maximum vehicle speed normally imposed by the vehicle's engine control so that the operator may safely pass other vehicles.

BACKGROUND ART

Vehicle engines, and particularly truck engines, are typically controlled by electronic engine control modules which implement various methods of controlling the vehicle engine to optimize the operation of the vehicle. For example, U.S. Pat. No. 5,477,827, assigned to Detroit Diesel Corporation, also the assignee of the present invention, discloses a system and method for controlling an engine including the capability of establishing a normal maximum speed and adding to that maximum speed for a selected time period as a driver performance incentive whenever the driver operates the vehicle within certain established performance goals, such as minimization of idle time, selection of the optimal transmission gear, maintaining a steady throttle, or reducing the use of engine driven accessory loads.

The capability of establishing a normal speed limit provides fleet managers and individual truck owners with the capability of insuring that their truck operators drive safely and meet desired fuel efficiency and other vehicle and engine operation goals. However, programming electronic engine control modules to establish vehicle speed limits which may, for example, maximize fuel efficiency, may otherwise limit the operator's ability to operate the vehicle in an optimal fashion in an atypical situation, such as an emergency, or when it is desirable to safely pass other vehicles at a speed in excess of the established normal speed limit for the vehicle.

DISCLOSURE OF INVENTION

It is therefore an object of the present invention to provide a system and method for controlling an engine which allows the manufacturer, fleet manager, or vehicle owner to establish a normal vehicle speed limit, but which also allows the vehicle operator to exceed that established speed limit to allow the operator to safely pass other vehicles, or otherwise operate the vehicle at a higher speed in an emergency.

It is also an object of the present invention to provide a system and method for controlling a vehicle engine which provides the operator the capability of manually operating the vehicle to exceed the established normal speed limit of the vehicle for a preselected time period, including warning the operator when the period during which the operator can manually override the vehicle speed limit is about to lapse.

In carrying out the above and other objects, the method of the present invention includes establishing a normal vehicle speed limit, establishing a passing duration period, establishing a passing override reset interval, and controlling the engine in response to operator input to provide a vehicle speed exceeding the normal vehicle speed limit for a cumulative passing period not greater than the passing duration period at any time during the passing override reset interval.

When implemented on an electronic engine control module, the system and method of the present invention thus allows an operator to override the normal vehicle speed limit imposed, for example, by the vehicle fleet manager, for a limited period of time to allow the vehicle operator to safely pass other vehicles.

In one embodiment, the method of the present invention also includes establishing a passing speed increment. The engine is controlled to allow the operator to increase the vehicle speed beyond the normal speed limit by an amount up to but not exceeding the passing speed increment.

In another embodiment, the method of the present invention also includes establishing a warning period, and issuing a warning to the operator whenever the amount of time that the operator may manually exceed the normal speed limit is less than the warning period. In this embodiment, the warning period is preferably set for an amount of time adequate to allow the vehicle's operator to complete his passing maneuver and return the vehicle to its normal speed at or below the established vehicle speed limit.

In one embodiment, the method of the present invention includes controlling the engine to gradually reduce the vehicle speed upon the expiration of the passing duration period to cause the vehicle to gradually slow to the normal maximum speed limit.

These and other objects, features and advantages of the present invention are readily apparent from the following detailed description of the best mode for carrying out the invention when taken in connection with the accompanying drawings.

BEST MODE FOR CARRYING OUT THE INVENTION

Figure 1:
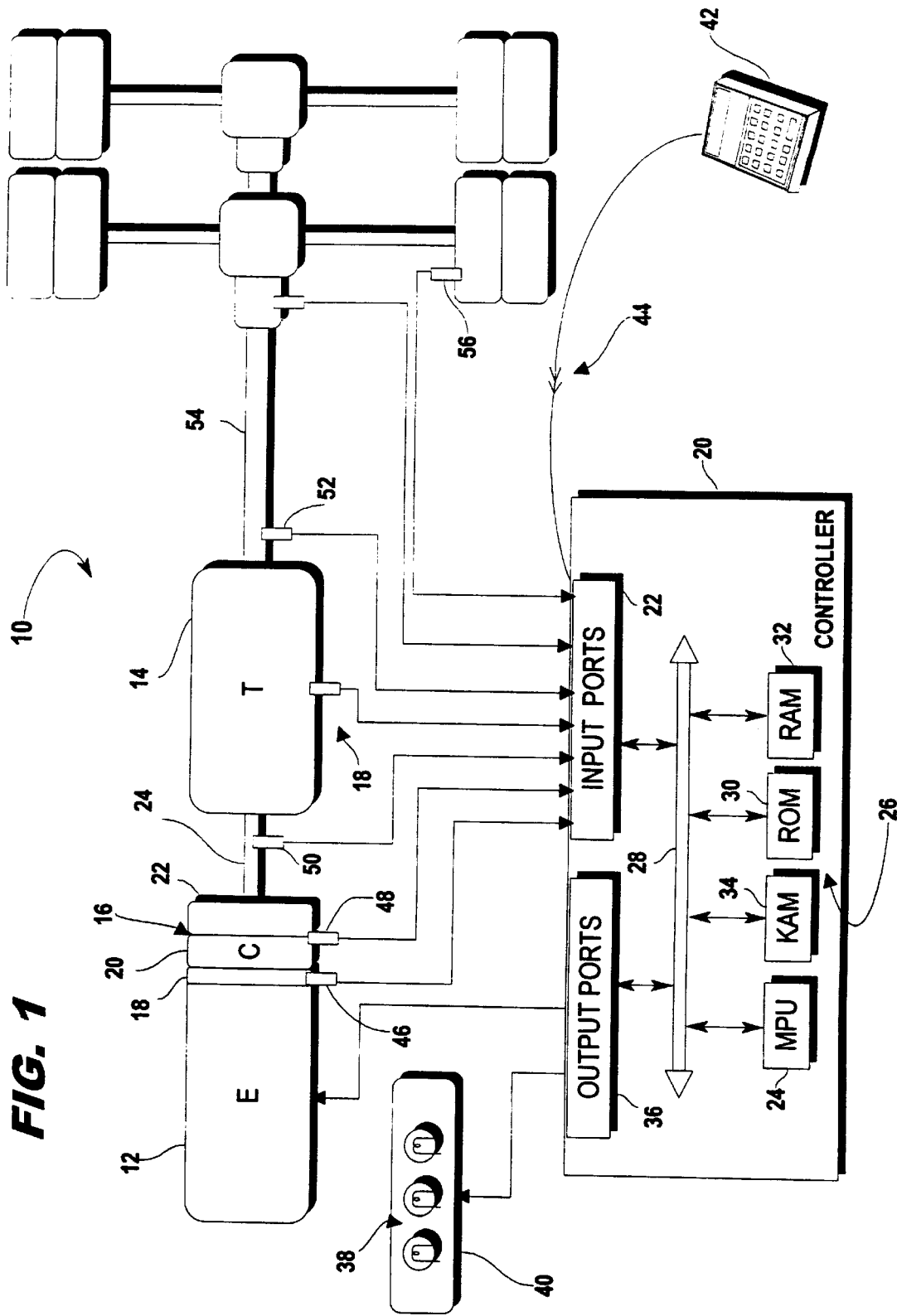
FIG. 1 is a block diagram illustrating a system including an electronic control module which may be programmed to employ the method of the present invention.

Referring now to FIG. 1, a block diagram illustrating a system including the vehicle passing speed timer according to the present invention is shown. The system is particularly suited for use in a vehicle, indicated generally by reference numeral 10, which includes an engine 12 coupled to a transmission 14 via a master friction clutch 16. In a preferred embodiment, engine 12 is a compression-ignition internal combustion engine, such as a four, six, eight, or more cylinder diesel engine. Transmission 14 is preferably a multiple gear ratio transmission which is manually or semi-automatically actuated to select one of the available gear ratios. Master friction clutch 16 may be manually or automatically controlled by a clutch actuator (not specifically illustrated) as is well known in the art.

Vehicle 10 may also include various sensors 18 for generating signals indicative of corresponding operational conditions or parameters of engine 12, transmission 14, clutch 16, and the like. Sensors 18 are in electrical communication with a controller 20 via input ports 22. Controller 20 preferably includes a microprocessor 24 in communication with various computer readable storage media 26 via data and control bus 28. Computer readable storage media 26 may include any of a number of known devices which function as a read-only memory (ROM) 30, random access memory (RAM) 32, keep-alive memory (KAM) 34, and the like. The computer readable storage media may be implemented by any of a number of known physical devices capable of storing data representing instructions executable via a computer such as controller 20. Known devices may include but are not limited to PROMs, EPROMs, EEPROMs, flash memory, and the like in addition to magnetic, optical and combination media capable of temporary or permanent data storage.

Computer readable storage media 26 include various program instructions, software, and control logic to effect control of various systems and sub-systems of vehicle 10, such as engine 12, transmission 14, and the like. Controller 20 receives signals from sensors 18 via input ports 22 and generates output signals which may be provided to various actuators and/or components via output ports 36. Signals may also be provided to a display device 40 which includes various indicators such as lights 38 to communicate information relative to system operation to the operator of the vehicle. Preferably, display 40 includes at least one illuminated indicator such as a check engine light to alert the operator to a malfunction or error. Display 40 may also include an alphanumeric portion or other suitable operator interface to provide status information to a vehicle operator or technician. As such, display 40 represents one or more displays or indicators which may be located throughout the vehicle interior and exterior but is preferably located in the cab or interior of the vehicle. A data, diagnostics, and programming interface 42 may also be selectively connected to controller 20 via a plug 44 to exchange various information therebetween. Interface 42 may be used to change values within the computer readable storage media 26, such as configuration settings, calibration variables, control logic and the like. Interface 42 may also be used to retrieve engine historical information logged as a result of diagnostic or malfunction codes, including information which is used to assist personnel performing routine maintenance, or troubleshooting malfunctions, as well as engine and vehicle operation data, including data specifically associated with the vehicle's passing speed timer feature of the present invention, which may be analyzed to evaluate vehicle operator performance in addition to vehicle performance.

Sensors 22 preferably include an engine speed sensor 46. Engine speed may be detected using any of a number of known sensors which provide signals indicative of rotational speed for flywheel 18, or various internal engine components such as the crankshaft, camshaft, or the like. In a preferred embodiment, engine speed is determined using a timing reference signal generated by a multi-tooth wheel coupled to the camshaft. A clutch sensor 48 may be provided to determine the clutch slip or engagement position of master friction clutch 16. An input shaft speed sensor 50 may be provided to determine the input speed of transmission 14. An output shaft sensor 52 may be provided to detect the rotational speed of output shaft 54. Wheel speed sensors, such as sensor 56, may be used to provide an indication of the current wheel speed of one or more vehicle wheels. Such sensors are commonly used in traction control systems (TCS) and anti-lock braking systems (ABS). Of course, one or more sensors may provide signals to various other controllers which are eventually communicated to controller 20 rather than being directly connected via input ports 22 as illustrated in FIG. 1.

As will be appreciated by one of ordinary skill in the art, most vehicle applications will neither require nor utilize all of the sensors illustrated in FIG. 1. As such, it will be appreciated that the objects, features, and advantages of the present invention are independent of the particular manner in which the selected operating parameters are sensed.

In operation, controller 20 receives signals from sensors 18 and executes control logic embedded in hardware and/or software to implement the vehicle passing speed control feature of the present invention. In a preferred embodiment, controller 20 is the DDEC controller available from Detroit Diesel Corporation in Detroit, Mich. Various other features of this controller are described in detail in U.S. Pat. Nos. 5,477,827 and 5,445,128, the disclosures of which are hereby incorporated by reference in their entirety.

Referring now to FIGS. 2 through 5, flow charts illustrating representative control logic 100 of a system and method according to the present invention are shown. As will be appreciated by one of ordinary skill in the art, the control logic may be implemented or effected in hardware, software, or a combination of hardware and software. The various functions are preferably effected by a programmed microprocessor, such as the DDEC controller, but may include one or more functions implemented by dedicated electric, electronic, and integrated circuits. As will also be appreciated, the control logic may be implemented using any of a number of known programming and processing techniques or strategies and is not limited to the order or sequence illustrated here for convenience only. For example, interrupt or event driven processing is typically employed in real-time control applications, such as control of a vehicle engine or transmission. Likewise, parallel processing or multi-tasking systems and methods may be used to accomplish the objects, features, and advantages of the present invention. The present invention is independent of the particular programming language, operating system, or processor used to implement the control logic illustrated.

Figure 2:
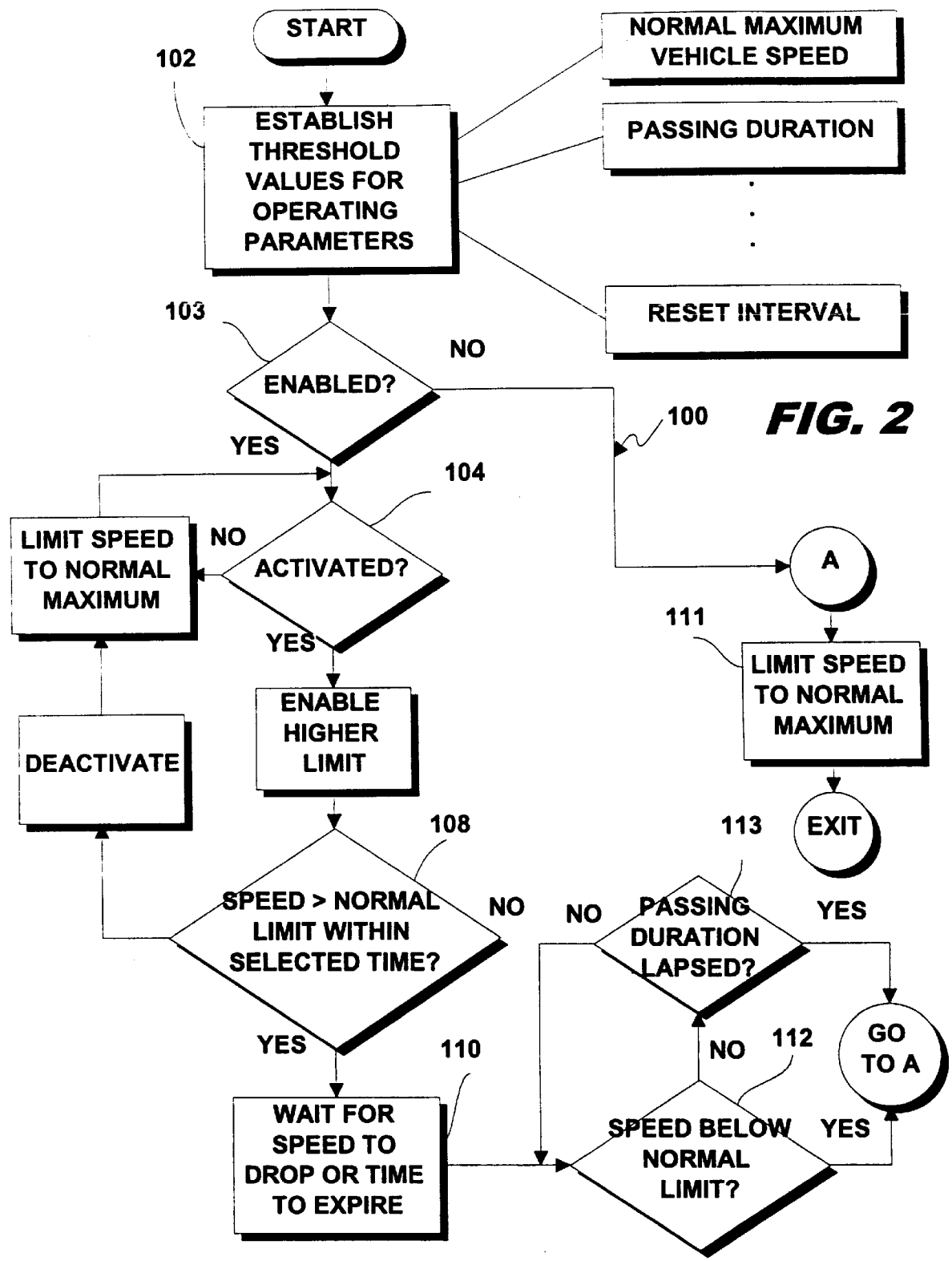
FIG. 2 is a flow chart generally illustrating the method of the present invention.

Block 102 of FIG. 2 represents initialization of various programming variables and thresholds, one or more of which may be determined during initialization or reprogramming of the system. Other values may be retrieved from a non-volatile memory or computer readable storage media upon engine start-up or other event such as detection of a fault or error. The reference values are determined and stored in memory, and preferably include vehicle speed, normal maximum speed, passing duration, and reset interval. Vehicle speed may be sensed directly and/or derived from the gear ratio and/or one or more of sensors 18. The gear ratio may be communicated by a transmission controller but is preferably a virtual gear ratio (VGR) which may be determined using the ratio of transmission input to output speed. One of ordinary skill in the art will recognize a number of methods to determine transmission input and output speeds which may be directly sensed or indirectly inferred from various other sensed parameters.

The passing duration and reset interval values, as well as the threshold values for other operating parameters described hereinafter, are typically programmed into the computer readable storage media 26 via interface 42 during the initial configuration of the engine control, or subsequently by the truck owner or fleet service personnel. The reference values determined by block 102 are periodically reset or captured (and stored) based on occurrence of one or more predetermined events.

The normal maximum road (vehicle) speed limit is typically set by the vehicle owner or fleet manager at a value which maximizes fuel efficiency, and/or otherwise maximizes the economical operation of the vehicle.

The passing duration is the time period during which the driver is allowed to manually request vehicle speed in excess of the normal maximum vehicle speed. In one embodiment, this time period may be programmed to be between 0 and 255 minutes, and is typically of about 30 minutes duration. It should be noted, however, that the system of the present invention can be configured to accommodate a passing duration period of greater than 255 minutes, if so desired.

The reset interval is the period of time after which the electronic control module 20 reestablishes the passing duration, to enable operation of the vehicle at passing speed in excess of the programmed vehicle speed limit for a period of time up to the passing duration period during the next interval. The reset interval is preferably 24 hours, but it can be any desired time period. In one embodiment, the reset interval is reestablished (i.e., a new 24 hour period begins) upon the lapse of the previous reset interval, regardless of the real time. In an alternative embodiment, the reset interval may be reestablished at midnight, based upon the real-time clock in the controller 20 in lieu of, or in addition to, reestablishing the interval period at the lapse of the current interval.

The threshold values for other operating parameters utilized in the method of the present invention, such as the passing speed increment the upper activation throttle position, the lower activation throttle position, the throttle sequence activation period, the warning period, and/or the ramp-down time are also preferably initialized at 102 as described above.

As indicated at 104, if the passing speed timer is enabled, the system periodically determines whether the operator has made a manual speed request, such as by moving the foot pedal. It should be noted that it is contemplated that the passing speed timer of the present invention will be enabled to provide speed in excess of the vehicle speed limit to the operator only upon manual input by the operator, since it is anticipated that this excess speed will be utilized only for passing or other unanticipated emergencies. Thus, if the operator has not made a manual request for speed (e.g., cruise control or another automatic speed control is in effect), the system exits the passing speed logic 100. If the driver has made a manual speed request, the system checks, at 106 to determine whether the requested speed is greater than the normal vehicle speed limit. If the requested speed is within the normal vehicle speed limit, the system exits logic 100.

In one embodiment, the passing speed adder of the present invention is activated by a specific positioning sequence of the throttle. In this embodiment the driver must press the throttle pedal above an upper activation throttle position (preferably between 60 and 99% of full throttle, and most preferably about 95% of full throttle), then release the throttle to a position below the lower activation throttle position (preferably between 1 and 50% of full throttle, and most preferably about 5% of full throttle), then above the upper limit again, then below the lower limit, and then above the upper limit for a third time, all within a specified activation period. The activation time may be any preselected time which is adequate to allow the driver to move the throttle through the sequence of positions required to activate the feature. This time period is preferably set to between 1 and 20 seconds, and most preferably about 3 seconds.

It will be appreciated that other predefined throttle positioning sequences may be utilized to activate the passing speed timer of the present invention. The sequence should preferably be simple, relatively quick to perform, and preferably not a sequence of throttle positions which might be encountered in the course of normal driving. Alternatively, a separate switch, or other operator signaling device, may be utilized to activate the passing speed adder without departing from the spirit of the present invention.

It should be noted that it is contemplated that the method and system of the present invention will be implemented in conjunction with other systems and methods which automatically adjust the vehicle speed limit, such as the fuel economy speed limit adder disclosed in U.S. Pat. No. 5,477,827, or other speed-based incentive engine controls. When the method of the present invention is implemented with, for example, a fuel economy speed adder, it is contemplated that the passing speed increments, the fuel economy incentive speed adder, and any other speed adders will be cumulatively added to the vehicle's normal speed limit when appropriate. Of course, if desired, a programmable optimal vehicle speed limit may be provided to limit the cumulative total of the normal maximum vehicle speed and any cumulative total speed adders.

If (as shown at 108) the requested speed is greater than the normal maximum vehicle speed (and any other speed adders) within a selected threshold time period (preferably about 20 seconds), the system will allow the vehicle to operate at a higher speed until the speed requested by the operator drops or until the passing duration time expires (as shown at 110). If the speed requested by the operator is now below the normal limit (at 112), the system thereafter limits the speed to its normal maximum (at 111). If the vehicle speed is above the normal maximum, the system checks to determine whether the passing duration interval has lapsed (at 113). If not, the system continues to monitor the vehicle speed and the amount of time left in the passing duration interval. If the passing duration interval has lapsed (at 113) the system restores the speed limit to the normal maximum (plus any other vehicle speed adders supported by the system) until such time as the passing speed timer is again activated (as determined at 104).

Figure 3:
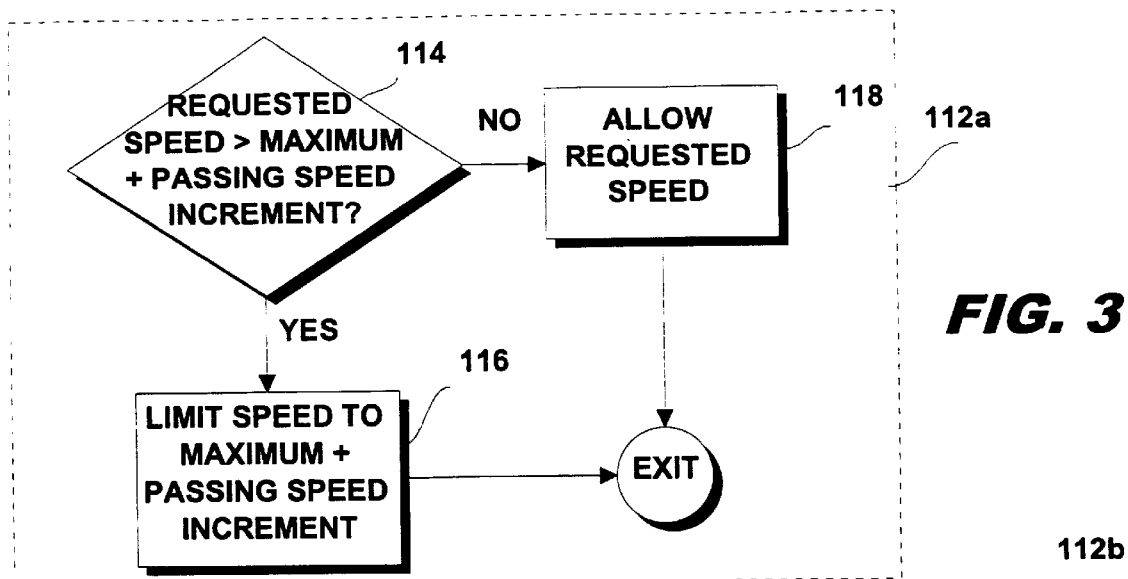
FIG. 3 is a flow chart illustrating a particular embodiment of the method of FIG. 2.

FIG. 3 illustrates one embodiment wherein the logic at 112 of FIG. 1 includes the additional capability of providing speed in excess of the normal vehicle speed limit up to an amount equal to an established passing speed increment. The passing speed increment variable in this embodiment would be established at 102 (in FIG. 1) as a threshold operating parameter at the time the system is configured, or at the time the vehicle passing speed feature of the present invention is enabled. A passing speed increment of between one and 20 miles per hour is preferably allowed. More preferably, the passing speed increment is ten miles per hour. Thus, in this embodiment, the logic at 112 determines whether the requested speed is greater than the sum of the normal maximum vehicle speed and the passing speed increment, at 114. If so, the system limits the vehicle speed to the sum of the maximum vehicle speed and the passing speed increment for the duration of the request, or for the remainder of the passing duration, whichever is less. If the requested speed is not greater than the sum of the vehicle speed limit and the established passing speed increment, the system allows the requested speed, at 118 for the duration of the request, or until the passing duration period has expired, whichever is sooner.

Figure 4:
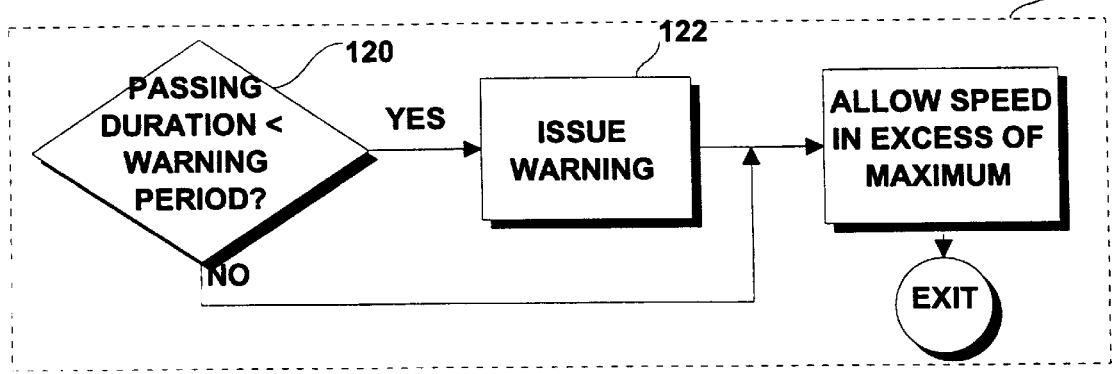
FIG. 4 is a flow chart illustrating another particular embodiment of the method of FIG. 2.

FIG. 4 illustrates another embodiment of the present system and method wherein the logic of block 112 (shown in FIG. 2) also includes logic for determining whether the passing duration period has diminished to a period of time less than an established warning period (at 120). If so, the system issues a warning, at 122, either in the form of a message on a graphic display, illuminating a light, activating an alarm, or other method of indicating to the operator that the passing speed timer is about to lapse and he/she will shortly be limited to the normal maximum vehicle speed. In one embodiment the system will cause the check engine lamp (CEL) to flash rapidly as a warning that the passing speed duration time is about to lapse. The established warning period is an adequate amount of time to allow the driver to complete a typical passing maneuver. In one embodiment this period may be set at 0–255 seconds, and is most preferably about one minute prior to the end of the passing duration.

Figure 5:
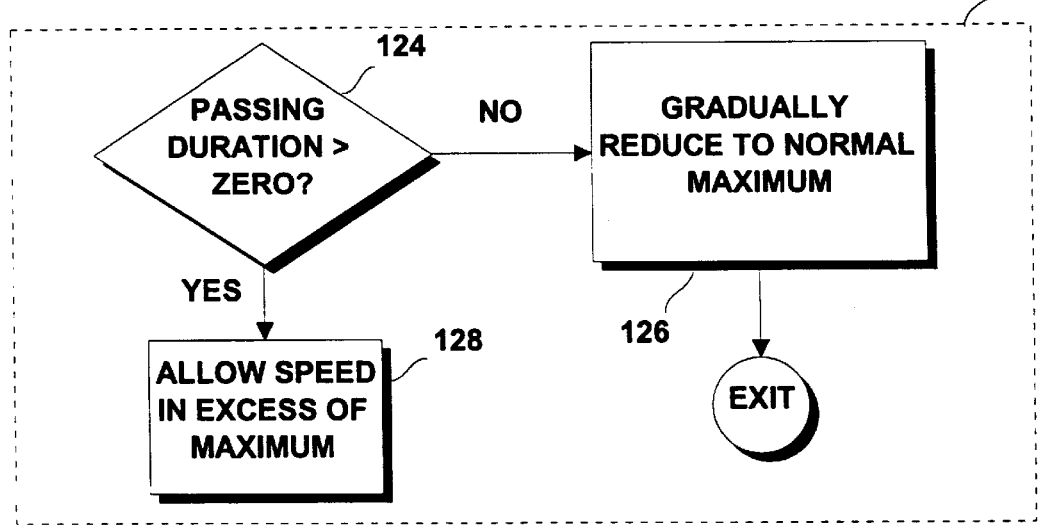
FIG. 5 is a flow chart illustrating yet another particular embodiment of the method of FIG. 2.

FIG. 5 illustrates additional logic which may be included in the logic at 112 of FIG. 2 which allows speed in excess of the normal maximum, but gradually reduces the vehicle speed once the passing duration period has lapsed, in order to allow the vehicle to gradually slow to the normal maximum speed limit. The system determines, at 124, whether the passing duration period is now equal to zero. If so, the system, at 126 allows the requested speed in excess of maximum (or, if the embodiment of FIG. 3 is implemented, the system allows the speed up to the maximum plus any other speed adders, plus the passing speed increment). The speed is, however, gradually reduced following expiration of the passing duration period, preferably at a rate adequate to slow the vehicle to the normal maximum speed within a preselected speed reduction time interval. In one embodiment, this ramp-down time is five seconds. The engine control can, of course, use any of a variety of methods to slow the vehicle to its normal maximum speed including controlling the fuel supply, and/or other engine breaking and speed control techniques such as are disclosed in U.S. Pat. No. 5,477,827, the disclosure of which is hereby incorporated herein.

If the passing duration period has not lapsed, the system allows speed in excess of the normal maximum as described above. As with the other threshold values, the ramp-down time is preferably established when the ECM is calibrated, or during a subsequent programming by authorized personnel, such as a fleet manager. In one embodiment, the ramp-down time may be specified to be between 0 to 255 seconds.

It will be appreciated that the various different embodiments of FIGS. 3–5 may be implemented alone or in conjunction with each other so that, for example, the system may limit requested speed to the normal maximum plus an established passing speed increment, issue a warning to the driver when the passing duration period is less than an established warning period, and/or gradually reduce the requested additional speed when the passing duration has lapsed.

To reduce the risk of tampering, it may be required that the time of the next reset interval, along with the current remaining duration value be periodically stored in memory. Whenever the system clock is changed to a time which prompts reinitialization of the reset interval, the then current value of the duration interval could be maintained until completion of the next reset interval. For example, assume the system establishes the reset interval at four hours and the passing duration interval at 30 minutes. If the vehicle has been operated so that there is one hour remaining in the current reset interval and there is six minutes of passing speed duration time remaining, and the system clock is moved ahead two hours, a new four hour reset interval is initiated, but only six minutes of passing duration time is allocated for the next four hour interval. Thereafter the passing speed duration will be reestablished to 30 minutes at the beginning of each subsequent reset interval. In this manner, an operator cannot easily obtain a full passing speed duration of 30 minutes by simply resetting the clock to the next four hour interval.

It will also be appreciated that the system of the present invention may record various data associated with the use of this feature for later review by the operator, fleet manager, vehicle owners, or service personnel. For example, the system may record cumulative time spent in "passing speed", cumulative distance traveled in "passing speed", and the time and frequency of any warnings issued. This information may be downloaded with other engine historical information using interface 42 or other known methods and apparatus.

Again, the particular order of operations illustrated is for convenience only. Preferably, one or more of the computations/decisions illustrated are made essentially concurrently and do not depend on the result of other operations except where necessary as will be recognized by one of ordinary skill in the art.

Thus, the present invention provides a system and method for allowing a vehicle operator the flexibility to operate his/her vehicle at a speed exceeding the normal vehicle speed limit to allow the driver to perform normal passing, and to provide additional speed in limited emergencies, while limiting this capability so as not to frustrate vehicle operation and safety goals attained by normally established vehicle speed limits.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method for controlling an engine to allow a vehicle operator to obtain a vehicle passing speed in excess of the normal vehicle speed limit, the method of comprising:

establishing a normal vehicle speed limit;

establishing a passing duration;

establishing a passing override reset interval;

controlling the engine in response to vehicle operator input to provide a vehicle speed exceeding the normal vehicle speed limit for a cumulative passing period not greater than the passing duration at any time during the passing override reset interval.

2. The method of claim 1 further including:

establishing a passing speed increment; and controlling the engine in response to vehicle operator input to provide a vehicle speed exceeding the normal vehicle speed limit by an amount not greater than the passing speed increment for a cumulative passing period not greater than the passing duration at any time during the passing override reset interval.

3. The method of claim 1 further including:

establishing a warning period;

warning the driver that the vehicle speed will be limited to the normal vehicle speed limit at the expiration of the warning period whenever the difference between the passing duration and the cumulative passing period is less than the warning period and the vehicle speed exceeds the normal vehicle speed limit.

4. The method of claim 1 further including controlling the engine to reduce the vehicle speed from a speed exceeding the normal vehicle speed limit to the normal vehicle speed limit once the passing duration has lapsed.

5. The method of claim 1 further including:

establishing a speed reduction interval; and including controlling the engine to reduce the vehicle speed during this speed reduction interval from a speed exceeding the normal vehicle speed limit to the normal vehicle speed limit once the passing duration has lapsed.

6. The method of claim 1 further including:

setting the cumulative passing period to zero upon the expiration of the passing override reset interval.

7. A method for controlling an engine in a vehicle including an internal combustion engine in communication with an electronic control module to allow the operator to attain a passing speed greater than the preset vehicle speed limit, the method comprising:

establishing a normal vehicle speed limit;

establishing a passing speed increment;

establishing a passing duration;

establishing a passing override reset interval;

controlling the engine in response to vehicle operator input to provide a vehicle speed exceeding the normal vehicle speed limit by an amount not greater than the passing speed increment for a cumulative period not greater than the passing duration at any time during the passing override reset interval; and upon the expiration of the passing override reset interval, resetting the passing duration and the passing override reset interval to their established values, to allow for operator requested passing speed exceeding the vehicle speed limit for the next override reset interval.

8. The method of claim 7 wherein the vehicle speed limit, passing speed increment, passing duration, and passing override reset interval values are established during calibration of the engine control module.

9. The method of claim 7 wherein establishing a passing speed increment comprises establishing a passing speed increment variable in the memory associated with the electronic control module with a preselected value.

10. The method of claim 7 wherein establishing a passing duration comprises establishing a passing duration variable in the memory associated with the electronic control module with a preselected value.

11. The method of claim 7 wherein establishing a passing override reset interval comprises establishing a passing override reset interval variable in the memory associated with the electronic control module with a preselected value.

12. The method of claim 1 wherein the passing override reset interval is reset at a selected real time, and wherein the operator is allowed to exceed the normal vehicle speed limit by an amount not greater than the passing speed increment for a cumulative period equal to the established value of the passing duration period whenever the real time is equal to the selected real time.

13. The method of claim 12 further including:

determining whether the system clock has been changed to a time which would prompt resetting the passing override reset interval and resetting the passing duration to its established value, and if such a change has occurred, maintaining the current value of the duration interval rather than resetting it to its established value until completion of the next reset interval to prevent an operator from obtaining additional speed limit override time by changing the clock.

14. The method of claim 6 further including:

resetting the passing duration to its established value upon the expiration of the passing override reset interval.

15. The method of claim 14 further including:

determining whether the system clock has been changed to a time which would otherwise prompt setting the cumulative passing period to zero and resetting the passing duration to its established time, and if such a change has occurred, maintaining the cumulative passing period at its current value and not resetting the passing duration until completion of the next passing override reset interval.

16. In a method for controlling an engine to allow an operator to override then normal vehicle speed limit for a cumulative passing period which is reestablished at a predefined reset interval, a method of determining whether the operator has tampered with the engine control system clock to obtain an additional time period for exceeding the normal vehicle speed limit, the method including:

determining whether the system clock has been changed to a time which would prompt reinitialization of the passing period during which the operator may override the vehicle speed limit and, if such a change has occurred, suspending any steps which would allocate additional capability to the operator to exceed the normal speed limit until the completion of the next full reset interval.

17. In a method for controlling an engine which provides the operator with a particular operating capability for a time period which is reestablished at a predefined reset interval, a method of determining whether the operator has tampered with the engine control system clock to obtain an additional time period for the particular capability, the method including:

determining whether the system clock has been changed to a time which would prompt reinitialization of the time period during which the operator may utilize the particular capability and, if such a change has occurred, suspending any steps which would provide the capability to the operator for any additional time.

* * * * *

UNITED STATES PATENT AND TRADEMARK OFFICE
CERTIFICATE OF CORRECTION

PATENT NO. : 6,347,272  
DATED : February 12, 2002  
INVENTOR(S) : Stephen Karl Flammersfeld, Richard M. Avery, Jr. and Ian D. McKenzie It is certified that error appears in the above-identified patent and that said Letters Patent is hereby corrected as shown below:

Column 8,  
Line 42, after "method" please delete "of".

Column 10,  
Line 28, after "override" please delete "then" and replace with -- the --.

Signed and Sealed this

Twenty-first Day of May, 2002

Attest:

Attesting Officer

JAMES E. ROGAN  
*Director of the United States Patent and Trademark Office*